United States Patent

Park

Patent Number: 4,991,933
Date of Patent: Feb. 12, 1991

[54] FRONT PROJECTION SCREEN

[75] Inventor: Hong C. Park, Seoul, Rep. of Korea

[73] Assignee: Goldstar Co., Ltd., Seoul, Rep. of Korea

[21] Appl. No.: 469,262

[22] Filed: Jan. 24, 1990

[30] Foreign Application Priority Data

Jan. 28, 1989 [KR] Rep. of Korea .................. 89-950

[51] Int. Cl.$^5$ ............................................. G03B 21/60
[52] U.S. Cl. .................................................. 350/129
[58] Field of Search ............... 350/330, 127, 128, 129

[56] References Cited

U.S. PATENT DOCUMENTS

| | | | |
|---|---|---|---|
| 2,086,556 | 7/1937 | Jacobson | 350/128 |
| 2,660,927 | 12/1953 | Burton | 350/129 |
| 2,738,706 | 3/1956 | Thompson, Jr. | 350/129 X |
| 3,191,495 | 6/1965 | Miller | 350/128 |
| 3,844,644 | 10/1974 | Martinez | 350/129 X |
| 4,298,246 | 11/1981 | Iwamura | 350/128 X |
| 4,767,186 | 8/1988 | Bradley, Jr. et al. | 350/128 |

Primary Examiner—Richard A. Wintercorn
Attorney, Agent, or Firm—Birch, Stewart, Kolasch & Birch

[57] ABSTRACT

A front projection screen includes front and rear refractive facets. The rear refractive facets are coated with refractive coating layers for reflecting an image light which has penetrated through the front refractive facets toward the front refractive facets. Upper and lower flanks are disposed at both upper and lower side surfaces of the rear refractive facets. Penetrative coating layers are formed on the lower flanks. A light-absorbing member is disposed between the penetrative coating layers and the upper flanks so as to absorb the illumination light (noise light).

1 Claim, 2 Drawing Sheets

4,991,933

FRONT PROJECTION SCREEN

BACKGROUND OF THE INVENTION

1. Field of the Invention

The present invention relates to a screen for use in a liquid crystal display (hereinafter "LCD") projector, and more particularly, to a front projection screen which includes a light-absorbing structure for maintaining a high contrast by extinguishing light illuminated on the front side of the screen.

2. Description of the Prior Art

In general, various types of front projection screens having spherical facets are well known in the art. One such front projection screen is illustrated in FIGS. 1A and 1B. As shown in the drawings, spherical facets 1 are repeatedly disposed on the front side of a reflective screen 2 in two dimensions. These spherical facets 1 have a specific geometry as shown in FIG. 1C and a reflective coating layer such as an aluminum coating layer disposed on the surface of the spherical facets 1.

FIG. 2 is an explanatory view illustrating the operation of such a front projection screen. As shown in the drawing, when an image light which forms a projection image is outputted from film 3, the image light is projected onto the screen 2 through a lens 4. The image light is then reflected by the screen 2. At this time, since light from an illuminator 5 is also reflected by the screen 2, two kinds of lights, i.e., the image light and noise light simultaneously reach the viewer's eyes 6.

That is, when the maximum angle of incidence of the image light which is directed to the screen 2 through the film 3 is $\alpha$, the minimum angle of incidence of the noise light from the illuminator 5 is $\beta$. When the maximum angle of incidence of the noise light from the illuminator 5 is $\gamma$, the image light is projected on the screen 2 within the range of the angle of incidence ($-\alpha$ to $+\alpha$) and the noise light from the illuminator 5 is incident upon the screen 2 within the range of the angle of incidence ($\beta$ to $\gamma$).

However, such a projection screen suffers from a number of difficulties such as, for example, since both the image light from the lens 4 and the noise light from the illuminator 5 are reflected by the screen 2, the contrast is too low to allow the watching of the screen with an illuminating light.

SUMMARY OF THE INVENTION

Accordingly, it is an object of the present invention to provide a front projection screen having a light-absorbing structure for absorbing the exterior illumination light (noise light), thereby preventing the light from being reflected by the spherical facets so as to enhance the contrast.

Another object of the present invention is to provide a screen for use in a LCD environment having refractive facets that are formed on the rear surface of a screen; upper and lower flanks that are formed on the upper and the lower side surfaces of the refractive facets; a penetrating layer that is formed on the lower flanks; and an extinguishing material that is filled between the upper and lower flanks so that the noise light from an illuminator penetrates the penetrating layer and is absorbed by the extinguishing material.

Other objects and further scope of applicability of the present invention will become apparent from the detailed description given below. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a screen for use in an LCD which comprises a front projection screen for use with a liquid crystal display which comprises front refractive facets for allowing the transmission of the image light and the illumination light (noise light) therethrough within the range of the incidence angles ($\pm\alpha$) and $\beta$ to $\gamma$, respectively, wherein $\alpha$ is a maximum angle of incidence of the image light, $\beta$ is a minimum angle of incidence of the noise light, and $\gamma$ is a maximum angle of incidence of the noise light; rear refractive facets disposed at the rear side of a screen so as to be opposed to the front refractive facets; reflective coating layers formed on the rear refractive facets and are adapted to reflect the image light penetrating through the front refractive facets toward the front refractive facets; upper and lower flanks and disposed at both the upper and the lower side surfaces of the rear refractive facets; penetrating coating layers formed on the lower flanks 9 for allowing the penetration of the illumination light (noise light) through the front refractive facets; and a light-absorbing member disposed between the penetrating coating layers and the upper flanks so as to absorb the illumination light (noise light) penetrating through the penetrating coating layers.

BRIEF DESCRIPTION OF THE DRAWINGS

The present invention will become more fully understood from the detailed description given below and the accompanying drawings which are given by way of illustration only, and thus are not limitative of the present invention, and wherein.

DESCRIPTION OF THE PREFERRED EMBODIMENTS

Figure 1A:
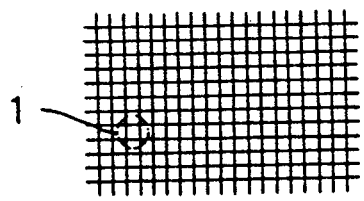
FIG. 1A is a top plan view of a conventional front projection screen.
Figure 1B:
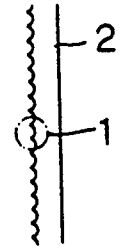
FIG. 1B is a cross-sectional view of the conventional front projection screen.
Figure 1C:
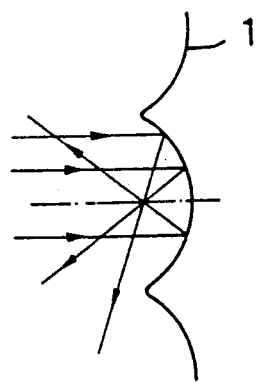
FIG. 1C is an enlarged front elevational view of a spherical facet of FIG. 1B.
Figure 2:
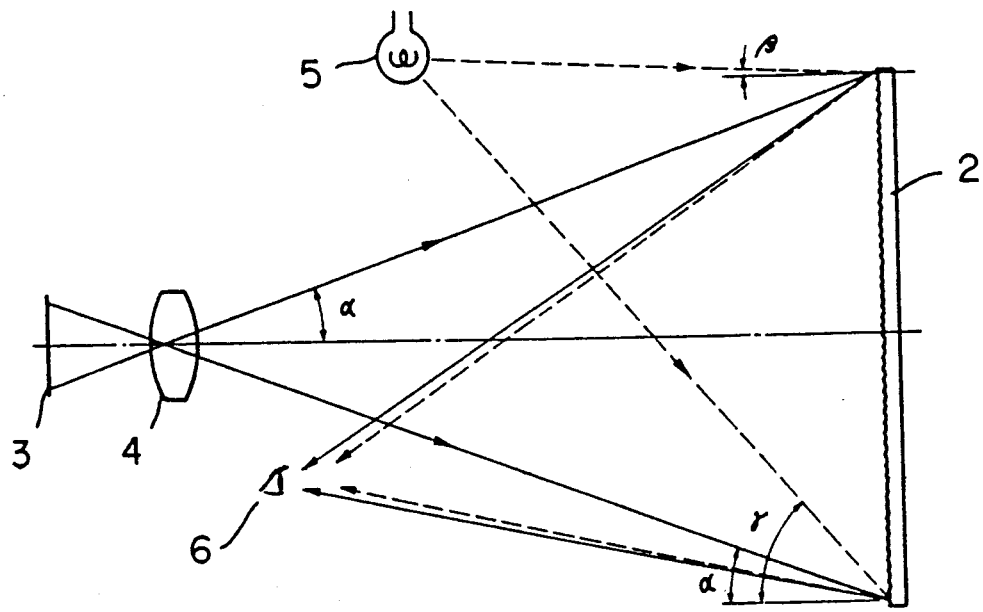
FIG. 2 is an explanatory view illustrating the operation of the conventional front projection screen.
Figure 3:
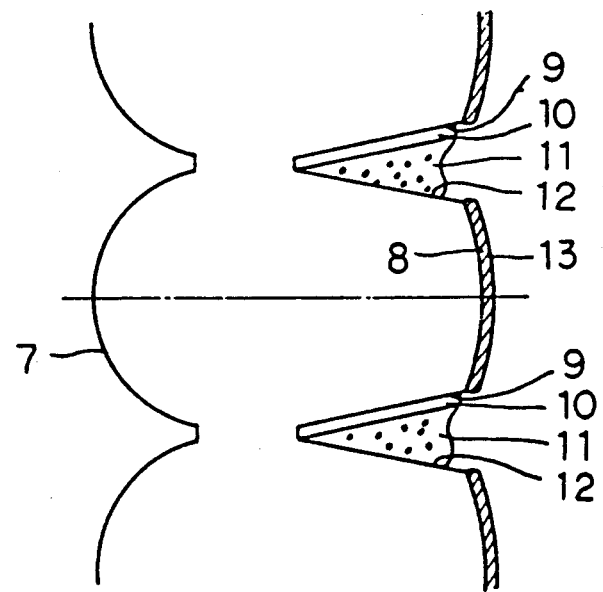
FIG. 3 is a cross-sectional view of the front projection screen of the present invention.

Referring now to the drawings for the purpose of illustrating preferred embodiments of the present invention, the front projection screen as shown in FIG. 3 includes front refractive facets 7 disposed on the front face of a screen 2 and rear refractive facets 8 disposed on the rear face of the screen 2. On the upper and the lower side surfaces of the rear refractive facets 8, upper flanks 12 and lower flanks 9, both having straight sections, are formed. On the surfaces of the lower flanks 9, a penetrating coating layer 10 is formed. Also, on the surfaces of the rear refractive layers 8, a reflective coating layer 13 made of aluminum is provided. By these arrangements, the exterior illumination light (noise light) penetrates through the penetrating coating layer 10 and the image light is reflected from the reflective coating layer 13. Between the penetrating coating layer 10 and the upper flanks 12, an extinguishing material (light absorbing material) 11 is filled so that the illuminating light penetrating through the penetrating coating layer 10 is absorbed by the extinguishing material, i.e., the light-absorbing structure 11.

Figure 4:
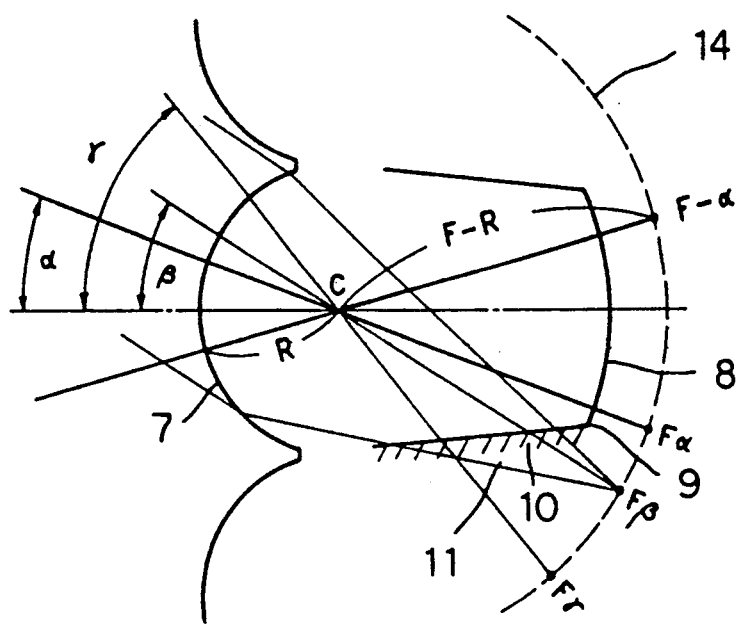
FIG. 4 is an explanatory view illustrating the operation of the front projection screen of the present invention.

FIG. 4 shows the operation of the front projection screen of the present invention. As shown in FIG. 4, the screen 2 according to the present invention is constituted so that the image light penetrating through the front refractive facet 7 is focused on the portion (F$-\alpha$ to F$\alpha$) of the focal sphere 14 through the rear refractive facet 8, while the illumination light (noise light) penetrating through the front refractive facet 7 is focused on the portion (F$\beta$ to F$\gamma$) of the focal sphere 14 through the lower and the upper flanks 9 and 12.

The radius of curvature R of the front refractive facet 7 is determined by the range of the incidence angle ($\beta$ to $\gamma$) of the illumination light (noise light) in relation to the thickness of the screen. The radius of curvature of the rear refractive facet 8 is determined by the view angle of the screen in relation to the front refractive facet 7. This geometry is determined so that the distribution of luminance of the reflective light which depends upon the view angle is of a substantially uniform angle.

According to the present invention, the front projection screen operates as follows:

Incidence parallel rays of light are focused on the focal sphere 14 by the front refractive facet 7 wherein the focused positions of parallel rays of light depend upon the incidence angles of the rays. At this time, the parallel rays of light of the image light being incident within the range of the incidence angle ($\pm\alpha$) are focused on the portion (F$-\alpha$ to F$\alpha$) of the focal sphere 14. The parallel rays of light of the image light being incident upon the range of the angle of incidence ($\beta$ to $\gamma$) are focused on the portion (F$\beta$ to F$\gamma$) of the focal sphere 14. FIG. 4 also shows that a bundle of parallel rays of light being incident at the incidence angle ($\beta$) are focused on the portion (F$\beta$) of the focal sphere 14. The image light being focused on the portion (F$\alpha$ to F$-\alpha$) of the focal sphere 14 is reflected by the reflective coating layer 13 coated on the rear refractive facet 8 and passes back through the front refractive facet 7. The geometry of the refractive facet 8 has to be determined so that substantially all the image light is distributed within a wide range angle.

On the other hand, the illumination light (noise light) being focused on the portion (F$\beta$ to F$\gamma$) of the focal sphere 14 penetrate through the penetrative coating layer 10 coated on the lower flank 9. Thereafter, the illumination light (noise light) is absorbed by the light-absorbing structure 11 and prevented from being reflected. The penetrative coating layer 10 can be a transparent material which has a refractive index similar to that of the screen being used.

By these arrangements, the image light is reflected by the front and the rear refractive facets 7 and 8 and the lower flanks 9 and the noise light from the illuminator is absorbed by the light-absorbing structure 11, thereby creating a high contrast image.

The present invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A front projection screen for use in a liquid crystal display, comprising:
   front refractive facets means for allowing an image light and an illumination light to penetrate therethrough within a range of an angle of incidence $-\alpha$ to $+\alpha$ and $\beta$ to $\gamma$, respectively, wherein $\alpha$ is a maximum angle of incidence of the image light, $\beta$ is a minimum angle of incidence of the illumination light, and $\gamma$ is a maximum angle of incidence of the illumination light;
   rear refractive facets disposed at a rear side of the screen and opposed to said front refractive facets;
   reflective coating means, formed on said rear refractive facets, for reflecting the image light penetrating through said front refractive facets toward said front refractive facets;
   upper and lower flanks disposed at both the upper and the lower side surfaces of said rear refractive facets;
   penetrating coating means, formed on said lower flanks, for allowing the illumination light to penetrate through said front refractive facets; and
   light-absorbing means, disposed between said penetrating coating means and said upper flanks, for absorbing the illumination light penetrating through said penetrating coating means.

* * * * *